United States Patent
Jiang et al.

(10) Patent No.: US 7,421,179 B1
(45) Date of Patent: Sep. 2, 2008

(54) APPARATUS AND METHOD FOR SWITCHING, MODULATION AND DYNAMIC CONTROL OF LIGHT TRANSMISSION USING PHOTONIC CRYSTALS

(76) Inventors: Wei Jiang, 10435 Burnet Rd., Suite 108, Austin, TX (US) 78758; Ray T. Chen, 10306 Sausalito Dr., Austin, TX (US) 78759

( * ) Notice: Subject to any disclaimer, the term of this patent is extended or adjusted under 35 U.S.C. 154(b) by 0 days.

(21) Appl. No.: 11/541,239

(22) Filed: Sep. 29, 2006

(51) Int. Cl.
*G02B 6/10* (2006.01)
*G02B 6/12* (2006.01)

(52) U.S. Cl. .......................... 385/129; 385/14
(58) Field of Classification Search ......... 385/129–132, 385/3, 14, 24, 39, 45
See application file for complete search history.

(56) References Cited

U.S. PATENT DOCUMENTS 6,917,431 B2 7/2005 Soljacic et al.
7,068,865 B2 6/2006 Hamann et al.
2006/0093299 A1* 5/2006 Ogawa et al. ............... 385/129

* cited by examiner

*Primary Examiner*—Charlie Peng

(57) ABSTRACT

An active device for dynamic control of the transmission properties has at least one photonic crystal waveguide that has an electrically insulating layer formed within or near the waveguide core and two lateral conductive regions divided by the insulating layer. An alternating voltage signal induces phase and amplitude changes of electromagnetic wave propagating inside the device. Electromagnetic wave signals propagating through two such active photonic crystal waveguide devices may be mixed to produce at least one output signal through interference. Devices having one or more such active photonic crystal waveguides may be utilized as a tunable optical delay line, a tunable optical filter, a switch, or a modulator. A preferred embodiment comprises a photonic crystal waveguide made of a silicon slab with a periodic array of apertures or oxide columns therein, wherein an silicon oxide layer disposed in the waveguide core separates a p-doped region from an n-doped region.

23 Claims, 14 Drawing Sheets

APPARATUS AND METHOD FOR SWITCHING, MODULATION AND DYNAMIC CONTROL OF LIGHT TRANSMISSION USING PHOTONIC CRYSTALS

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of the contracts FA9550-04-C-0095 and FA9550-05-C-0171 awarded by Air Force Office of Scientific Research.

CROSS REFERENCE TO RELATED APPLICATIONS

Not Applicable

DESCRIPTION OF ATTACHED APPENDIX

Not Applicable

BACKGROUND OF THE INVENTION

This invention relates generally to the field of optical devices, and more specifically to an apparatus and method for switching, modulation and dynamic control of light transmission using photonic crystals.

Photonic crystals are a class of novel materials that offer new opportunities for the control and manipulation of light. Essentially, a photonic crystal consists of a periodic lattice of dielectric materials. For example, a single slab of semiconductor that hosts a periodic array of air holes or oxide columns. The underlying concept of photonic crystals originated from seminal work by Eli Yablonovitch and Sajeev John in 1987. The basic idea was to engineer a dielectric superlattice so that it manipulates the properties of photons in essentially the same way that regular crystals affect the properties of electrons therein. Electrons in a regular crystal see a periodic array of atoms, the coherent scattering felt by the electrons in the crystal will prevent any electron from traveling in the crystal if the energy of the electron unfortunately falls into certain ranges. Each continuous energy range of such a property is called an energy gap. By the same token, a photonic band gap exists for photons in a photonic crystal in a continuous range of frequencies where light is forbidden to travel within the photonic crystal regardless of its direction of propagation. For a three-dimensional photonic crystal, such a bandgap renders the crystal an omni-directional mirror that reflects incident light in any direction. For a two-dimensional photonic crystal, such a bandgap causes the crystal to completely reflect in-plane incident light.

Photonic crystal waveguides are essentially one-dimensional defects created inside a photonic crystal, often by removing a row of "atoms." As the photonic crystal "walls" around the line-defect of a photonic crystal waveguides can completely reflect light for certain frequency ranges, light is forced to travel along the line-defect. Photonic crystal waveguides are known to be a promising element for constructing ultra-compact integrated optical devices than conventional integrated optical devices based on index-guiding schemes.

Active interferometer devices based entirely on photonic crystal waveguides were previously proposed by Soljacic et al. (see "Photonic-crystal slow-light enhancement of nonlinear phase sensitivity," by M Soljacic, S. G. Johnson, S. Fan, M. Ibanescu, E. Ippen, J. D. Joannopoulos, Journal of Optical Society of America B 19, pp. 2052-2059; September 2002). These authors proposed that the slow group velocities of light in photonic crystal waveguides can be utilized to dramatically increase the induced phase shift owing to small changes in the refractive index. This enabled them to propose a number of designs of two-dimensional photonic crystal based switches and modulators significantly smaller in size than conventional devices. A thermo-optic photonic crystal modulator was demonstrated by Vlasov et al. (see "Active control of slow light on a chip with photonic crystal waveguides," by Y. A. Vlasov, M. O'Boyle, H. F. Hamann & S. J. McNab, Nature, vol. 438, pp. 65-69; Nov. 3, 2005).

In some previously proposed Mach-Zehnder designs, little information is given regarding the structure and the means of changing the refractive indices of the constituent materials of a photonic crystal. Particularly, for an electro-optical modulator it is important to have a proper electrical structure that facilitates the coupling of electrical signals with light. Generally, proper design of electrical structures can greatly save power and increase the switching or modulation speed of an electro-optic device. For example, a structure can better achieve these goals if it allows maximum overlap between the region where light field is strongest and the region where the electrically induced refractive index change is strongest. On the other hand, lowering optical loss in such a device may place a constraint on achieving these goals. These design concerns have not been adequately considered previously.

Generally, an electro-optical modulator operating at 1 gigahertz or above is desired in optical communication and optical interconnection applications. If a device design can only function at a relatively low speed, then thermo-optic effect may dominate over the electro-optic effect or other effects. In a wide range of applications, an electro-optic switch or modulator working at high speed is always preferred to a thermo-optic modulator working at a low speed. Although there exist numerous conventional electro-optic modulators that do not comprise photonic crystals, they generally have large sizes and high power consumption. Hence electro-optical modulators based on new approaches are needed. Generally, an ultra-compact modulator with low heat generation is always preferred for use in integrated optoelectronic circuits.

BRIEF SUMMARY OF THE INVENTION

The primary object of the invention is to provide an integrated electro-optical modulator with reduced power consumption and mitigated heating generation for use in integrated optoelectronic circuits.

Another object of the invention is to reduce the device length of certain integrated optical devices using slow-light photonic crystal waveguides.

Another object of the invention is to present a device architecture more easily fabricated by the prevailing processing techniques of semiconductor microelectronics industry.

Other objects and advantages of the present invention will become apparent from the following descriptions, taken in connection with the accompanying drawings, wherein, by way of illustration and example, an embodiment of the present invention is disclosed.

In accordance with a preferred embodiment of the present invention, a device for dynamic control of light transmission comprises: a photonic crystal waveguide having a waveguide core along which light is guided, an electrically insulating layer formed within or near the waveguide core, a first substantially electrically conductive region formed on one lateral side of the electrically insulating layer, and a second substantially electrically conductive region formed on another side of the electrically insulating layer and coupled to the first substantially electrically conductive region across the electrically insulating layer.

In accordance with another preferred embodiment of another aspect of the present invention, a photonic crystal waveguide modulator or switch comprises: an input waveguide adapted to receive a signal, an optical splitter adapted to split the signal into a first and a second signal, a first waveguide adapted to receive and carry the first signal, a second waveguide adapted to receive and carry the second signal, and a coupling member adapted to receive the first and second signals from the first and second waveguides and mix the first and second signals to form at least one output signal, wherein at least one of the first and second waveguides comprises a photonic crystal waveguide comprising: an electrically insulating layer formed within or near the waveguide core, and two substantially electrically conductive lateral regions coupled to each other across the insulating region.

In accordance with another preferred embodiment of another aspect of the present invention, a method for applying dynamic control to the intensity, phase and other properties of the transmitted light comprises: applying an alternating voltage signal to two laterally separated substantially insulating layers capacitively coupled across the electrically insulating layer, which is embedded in the core of a photonic crystal waveguide. The photonic crystal waveguide can be a part of a photonic crystal waveguide modulator or a switch.

BRIEF DESCRIPTION OF THE DRAWINGS

The drawings constitute a part of this specification and include exemplary embodiments to the present invention, which may be embodied in various forms. It is to be understood that in some instances various aspects of the present invention may be shown exaggerated or enlarged to facilitate an understanding of the invention.

A more complete and thorough understanding of the present invention and benefits thereof may be acquired by referring to the following description together with the accompanying drawings, in which like reference numbers indicate like features, and wherein.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

While integrated electronic circuits have undergone numerous generation of device miniaturization in last few decades, integrated optical devices have seen relatively less prominent progress in this regard. Particularly, the length of conventional integrated optical modulators remains around a few millimeters to a few centimeters. Photonic crystal emerged in recent years as a promising technology for miniaturization of integrated optical devices. Although it was known theoretically that a photonic crystal waveguide based Mach-Zehnder modulator could have a significantly smaller device length than a conventional one owing to the slow group velocity of light in photonic crystal waveguides, first experiments demonstrated that thermo-optic modulation owing the periodic generation of heat dominates over other modulation effects. A thermo-optic modulator generally has a low modulation speed, which cannot be used for most optical communications and optical interconnects applications. For these applications, it is desirable to have a modulation speed above 1 gigahertz (GHz), which can be achieved, for example, by injecting carriers into a semiconductor constituting an optical waveguide. Generally, for this type of modulation to produce a modulation at 1 GHz or above, heat generation is to be minimized as it will not help modulation at such a high speed. On the other hand, excess heating often entails other problems and reduces device lifetime and reliability. By placing an insulating layer between two substantially conductive regions to which an alternating voltage signal is applied, no dc current can pass through the insulating layer. This helps reduce the heat generation. Such a structure is particularly important if the voltage signal is fed to the device as the output of a complicated electronic circuitry. Due to design problems or due to the aging of the circuitry, the voltage may not return to exact zero when it is supposed to vanish. If the modulator device allows a dc current to pass, such a remnant dc voltage may cause constant unintended heating and may reduce the device lifetime or cause reliability issues. The present invention provides a device architecture that overcomes these issues.

Figure 1:
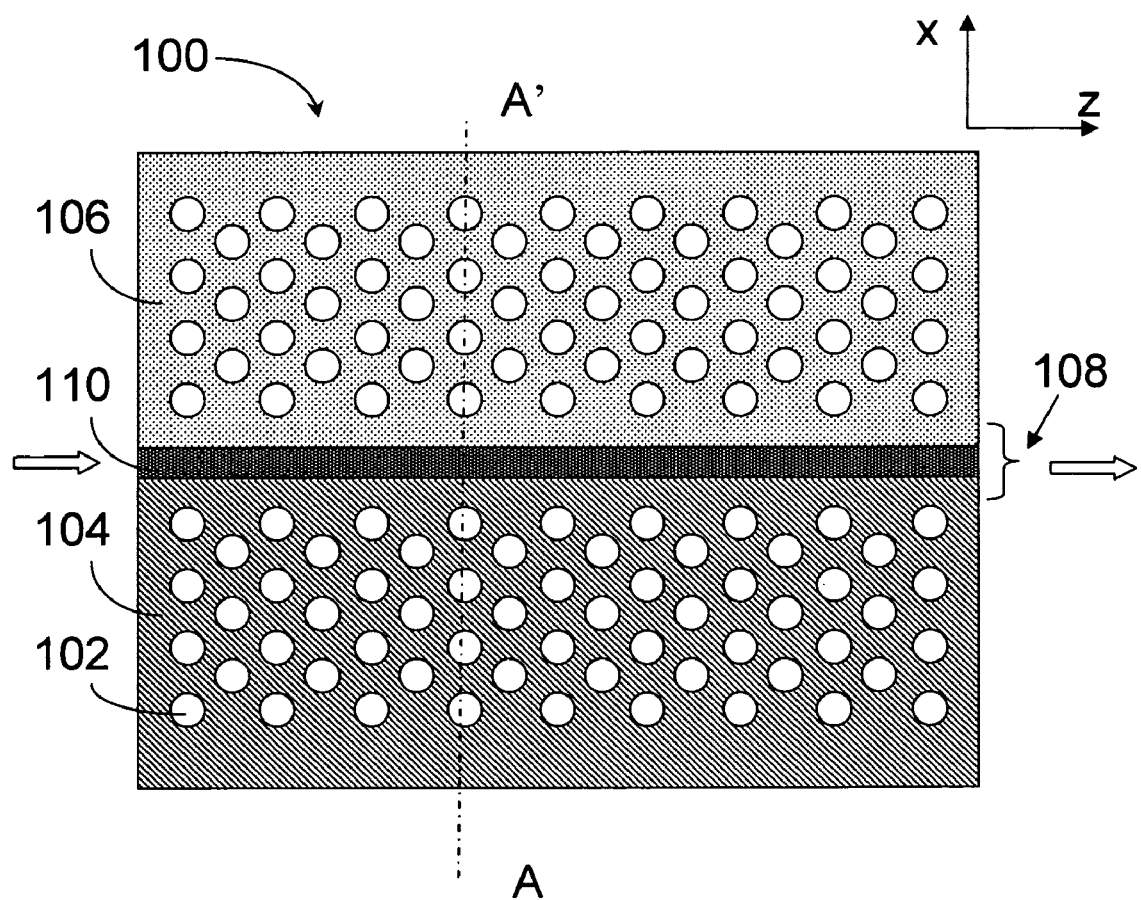
FIG. 1 is a top view of one embodiment of a photonic crystal waveguide device according to one aspect of the present invention.
Figure 2:
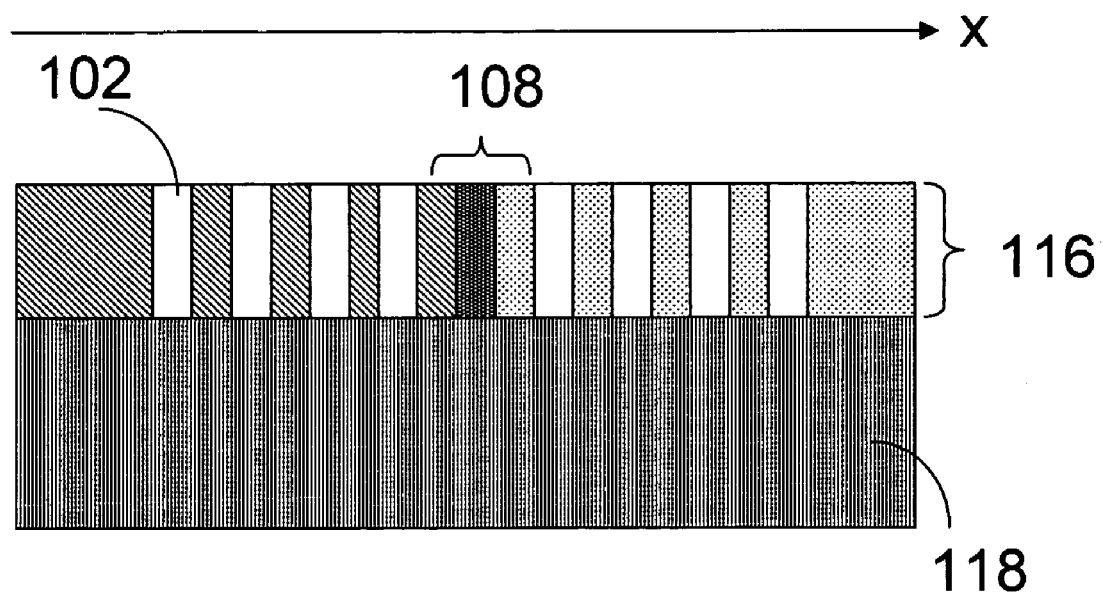
FIG. 2 is a cross-sectional view of the device shown in FIG. 1.

FIG. 1 depicts a top view of one embodiment of a photonic crystal waveguide device 100 that includes a number of columnar members 102 in two substantially electrically conductive regions 104 and 106 of a slab, a waveguide core 108 where the columnar members are absent, and an electrically insulating layer 110. In one preferred embodiment, the columnar members 102 in each of the two regions 104 and 106 are arranged to form a periodic lattice with a lattice constant α. In some embodiments, the width of the waveguide core may range from 0.01α to 100α. The arrows indicate the directions in which light is coupled into and out of the photonic crystal waveguide device 100. With reference to FIG. 2, which is a cross-sectional view of the photonic crystal structure 100 in FIG. 1 taken along line A-A', the columnar members 102 extend throughout the thickness of the slab 116 to reach a substrate 118. Although the structure within the slab 116 is substantially uniform in the vertical direction in this embodiment, one skilled in the art will understand that vertically non-uniform structures, such as the columnar members 102 whose radii are varying along the vertical direction, may be used as well. For a photonic crystal waveguide 100 comprising photonic crystals of two-dimensional periodicity, the wave-guiding in the vertical direction must be provided by the conventional index-guiding scheme. This means a substrate 118 and a superstrate (absent in the embodiment depicted in FIG. 2, meaning the air is actually used as the superstrate) with a lower effective refractive index relative to that of the slab material must be disposed below and above the slab 116, respectively. The substrate 118 and the superstrate prevent guided lightwave escaping far away from the top and bottom surfaces of the slab 116. The superstrate and substrate may also serve as an electrically insulating layer to prevent charges circumventing the thin electrically insulating layer 110. In most applications, it is desirable that the waveguide has a single guided mode. The insertion of an insulating layer 110 having a refractive index different from that of the slab 116 will necessitate other changes of the waveguide structure, for example, varying the width the waveguide core 108, to satisfy the single-mode condition.

In one embodiment, the slab 116 is formed from a material of high refractive index including, but not limited to, silicon, germanium, carbon, gallium nitride, gallium arsenide, gallium phosphide, indium nitride, indium phosphide, indium arsenide, zinc oxide, zinc sulfide, silicon oxide, silicon nitride, alloys thereof, metals, and organic polymer composites. Single crystalline, polycrystalline, amorphous, and other forms of silicon may be used as appropriate. Organic materials with embedded inorganic particles, particularly metal particles, may be used to advantage. In one embodiment, the superstrate and substrate 118 is formed a material whose refractive index is lower than that of the slab material. Suitable superstrate and substrate materials include, but not limited to, air, silicon oxide, silicon nitride, alumina, organic polymers and alloys thereof. In one embodiment, the columnar members 102 are formed from a material whose refractive index is substantial different from that of the slab 116. Suitable materials for the columnar members 102 include, but not limited to, air, silicon oxide, silicon nitride, alumina organic polymers, or alloys thereof. Suitable materials for the insulating layer 110 include, but not limited to, silicon oxide, silicon nitride, hafnium silicate, zirconium silicate, aluminum oxide, gadolinium oxide, ytterbium oxide, zirconium oxide, titanium oxide, tantalum oxide, niobium oxide, barium strontium titanate, intrinsic silicon, alloys thereof, and organic polymers. In one preferred embodiment, the slab 116 is formed from silicon, the columnar members 102 are formed from air, the superstrate (absent) is air, the substrate 118 is formed from silicon oxide, and the insulating layer 110 is formed from silicon oxide.

Figure 3:
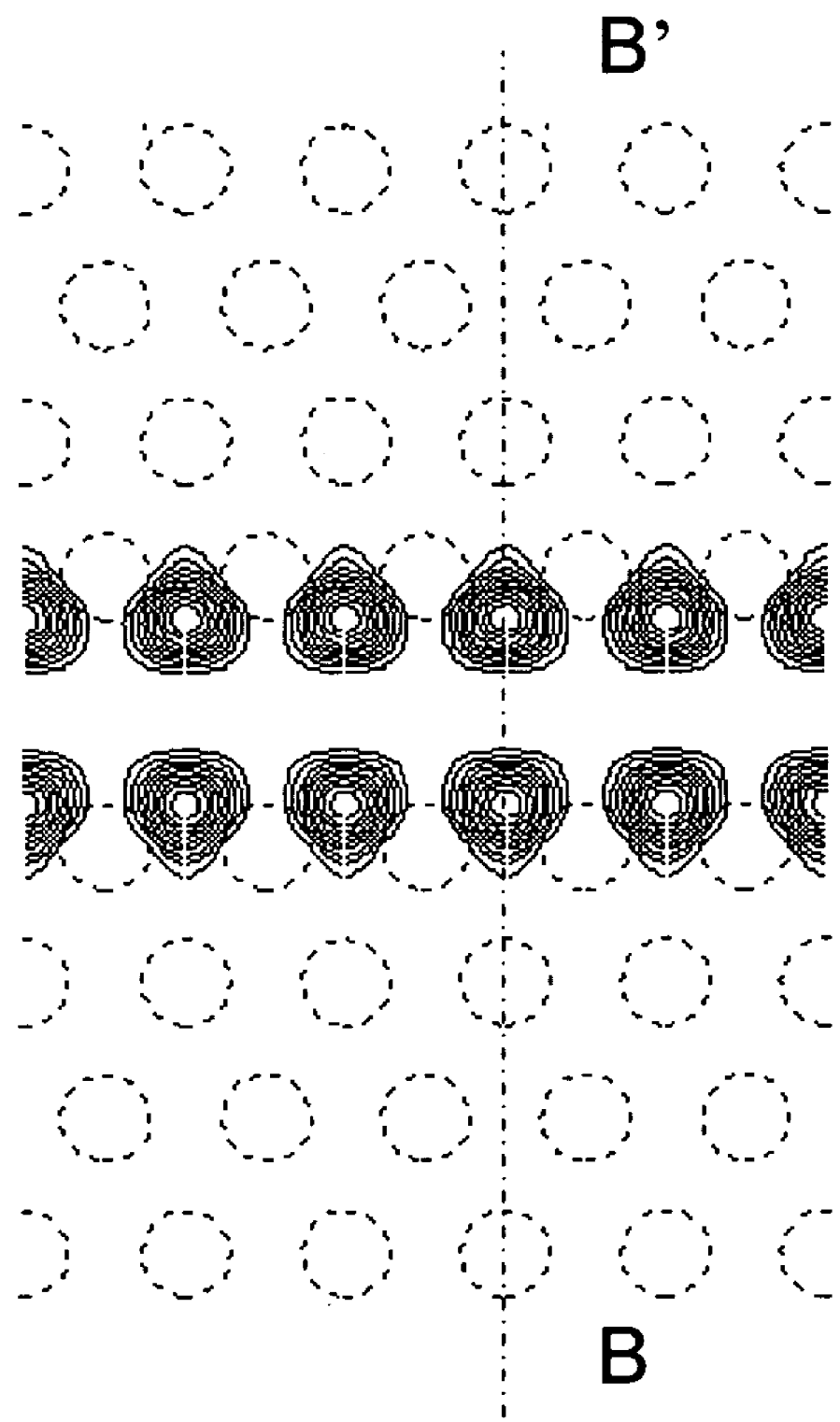
FIG. 3 is a top view of the field intensity pattern of a guided mode of a photonic crystal waveguide depicted in FIGS. 1 and 2.
Figure 4:
FIG. 4 is a cross-sectional view of the field intensity pattern of the guided mode depicted in FIG. 3.

FIG. 3 depicts a top view of the field intensity pattern of a guided mode of a waveguide 100 depicted in FIGS. 1 and 2. The dashed circles indicate columnar members of the photonic crystal waveguide. The insertion of an insulating layer 110 having a different refractive index than that of the slab 116 causes the field intensity pattern to be slightly modified. However, the pattern shows most of light intensity still concentrated in the waveguide core 108. FIG. 4 depicts a cross sectional view of the guided mode of the waveguide 100 taken along the line B-B' depicted in FIG. 3. The dashed rectangles indicate the cross sections of columnar members.

Figure 5A:
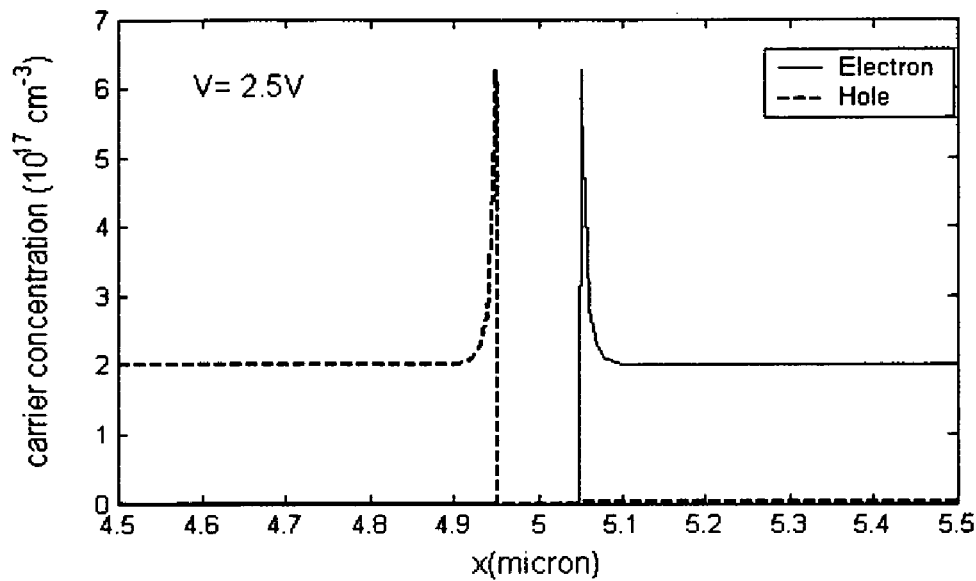
FIG. 5(a) is a plot of the concentrations of electrons and holes under a positive bias of for one embodiment of the present invention.
Figure 5B:
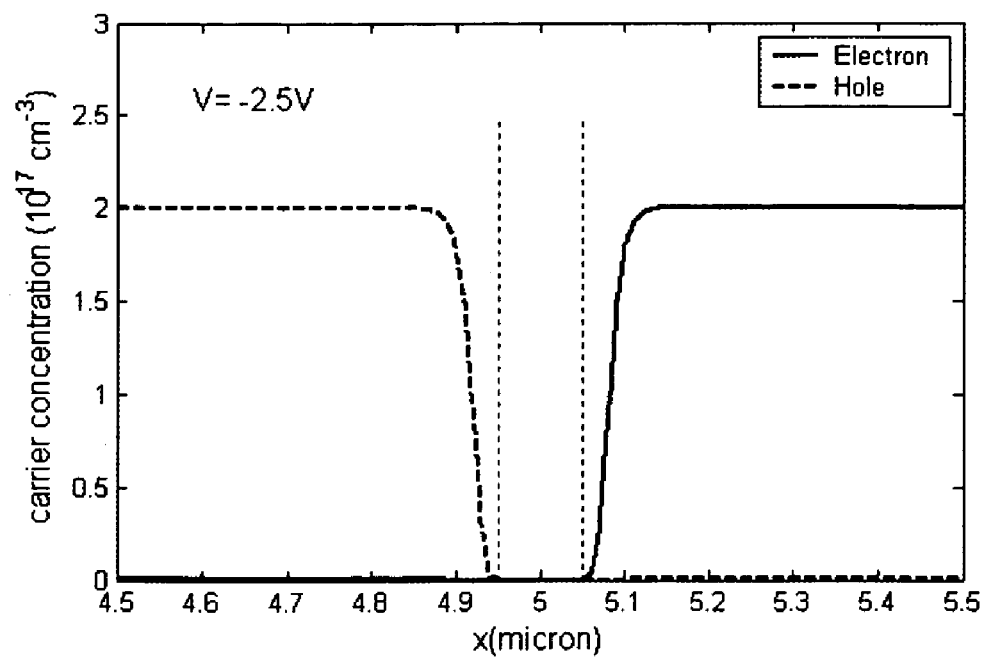
FIG. 5(b) is a plot of the concentrations of electrons and holes under a negative bias of for one embodiment of the present invention.

Referring now to FIGS. 5(a) and 5(b), which include two diagrams of the free carrier concentrations under two different bias voltages for one embodiment of the waveguide 100 depicted in FIGS. 1 and 2. The abscissa represents the distance along the x-axis depicted in FIGS. 1 and 2. For this exemplary embodiment, an insulating layer 110 is formed between x=4.95 microns and x=5.05 microns from silicon oxide, and the substantially electrically conductive region 104 is p-doped whereas the substantially electrically conductive region 106 is n-doped, which means that they are oppositely doped. In another embodiment, the region 104 may be n-doped while the region 106 is p-doped, which means that they are also oppositely doped. The region 106 is grounded, and the region 104 is biased at a voltage of V. As a positive bias voltage is applied across the waveguide 100, free carriers accumulate to two thin vertical layers proximate to the insulating layer 110, wherein the two thin vertical layers having substantial accumulation of holes and electrons for this exemplary embodiment are positioned around x=4.85 to 4.95 microns and x=5.05 to 5.15 microns, respectively. FIG. 5(a) depicts the concentrations of electrons and holes under a bias of V=2.5V for one embodiment of the present invention. As a negative bias voltage is applied across the waveguide 100 depicted in FIG. 1, free carriers retreat from the two thin vertical layers proximate to the insulating layer 110. FIG. 5(b) depicts the concentrations of electrons and holes under a bias of V=-2.5V for one embodiment of the present invention. By applying an alternating voltage across regions 104 and 106 in FIG. 1, the electrons and holes can be driven to dynamically accumulate to and retreat from the two thin vertical layers. For a preferred embodiment of the present invention, the waveguide core 108 depicted in FIG. 1 is 0.3 microns or wider and covers the entire area between x=4.85 microns and x=5.15 microns, which comprises the insulating layer 110 and the two thin vertical layers for accumulation and extraction of electrons and holes. Referring to FIGS. 3 and 4, the light field is strongest in the waveguide core. Thus, a significant overlap of the area where the light field is strongest and the area where the electron and hole concentrations are significantly modified by the applied voltage is achieved in accordance with FIGS. 5(a) and 5(b). In addition, for a preferred embodiment of the present invention, the regions 104 and 106 in FIG. 1 are lightly doped, wherein the dopant concentrations are generally on the order of $10^{17}$ cm$^{-3}$ or below for silicon. This helps reduce the optical loss of the photonic crystal waveguide 100.

Through the plasma dispersion relation, which takes, for example, the form of $$\Delta n = -[8.8 \times 10^{-22} \Delta N_e + 8.5 \times 10^{-18} (\Delta N_h)^{0.8}]$$

in silicon, the refractive index n of the silicon slab 116 is changed owing to the changes of electron and hole concentrations, $\Delta N_e$ and $\Delta N_h$. According to the present invention, the changes of the electron and hole concentrations, and therefore, the change of refractive index primarily occur in the waveguide core 108 depicted in FIG. 1, where light intensity is the strongest as shown in FIGS. 3 and 4. Thus, it is conducive to enhance the light-matter interaction and, therefore, the modulation efficiency of the photonic crystal waveguide device 100.

Figure 6:
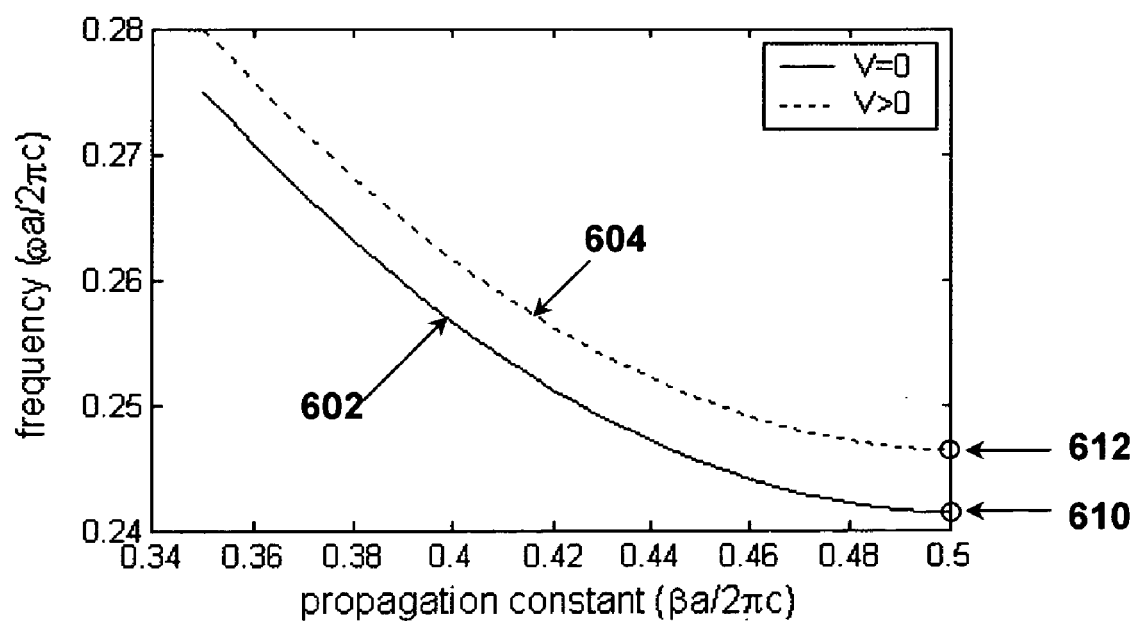
FIG. 6 illustrates a typical diagram of the dispersion relation of a photonic crystal waveguide depicted in FIGS. 1 and 2.

FIG. 6 depicts an illustrative diagram of the dispersion relation of a guided-mode of the photonic crystal waveguide device 100 depicted in FIG. 1. In FIG. 6, ω is the circular frequency of light, β is the propagation constant, and α is the lattice constant of the photonic crystal. The curve 602 represents the dispersion relation of the photonic crystal waveguide device 100 without applied voltage, whereas the curve 604 represents the dispersion relation of the photonic crystal waveguide device 100 with an applied voltage of, for example, 2.5V. The time delay of a signal is related to the group velocity of light defined by the slope of a dispersion relation curve $$v_g = d\omega/d\beta,$$

in the photonic crystal waveguide device 100. The working point of a photonic crystal waveguide under a bias voltage V can be obtained by intersecting a dispersion relation curve with a constant frequency line (a horizontal line in FIG. 6) corresponding to the circular frequency of input light. According to FIG. 6, the applied voltage changes the working point of the device 100 depicted in FIG. 1. Thus, it modifies the group velocity of light in the device 100, and therefore tunes the time delay of the signal passing through the device 100. In one embodiment, the device 100 may be used as a tunable optical delay lines that can be used in a variety of optical interconnects and optical communication applications. Owing to the small dimensions of the device 100, one can potentially integrate a large array of such delay lines 100 on a single semiconductor chip. Such device integration significantly reduces the volume, weight, and cost of a delay line array, and is highly desirable in many applications.

Furthermore, generally, a photonic crystal waveguide is known to transmit an optical signal only for certain ranges of frequencies, called transmission bands, outside which no guided mode exists. With continued reference to FIG. 6, without applied voltage the transmission band for the photonic crystal waveguide has a lower edge at 610 according the curve 602; with an applied voltage the transmission band changes and the lower edge shifts to 612 according to the curve 604. Thus, the device 100 depicted in FIG. 1 may serve as a tunable optical filter. Although this embodiment only illustrates the change of the lower edge of a transmission band of a photonic crystal waveguide device, those skilled in the art will understand that other forms of changing the transmission band properties can be achieved by properly choosing the device parameters and structures in accordance with the teachings of the present invention.

It is understood that the photonic crystal waveguide 100 illustrated in FIGS. 1 and 2 may be incorporated into various other optical devices or modules for dynamic control of the intensity, phase, path selection and other properties of a light signal.

Figure 7:
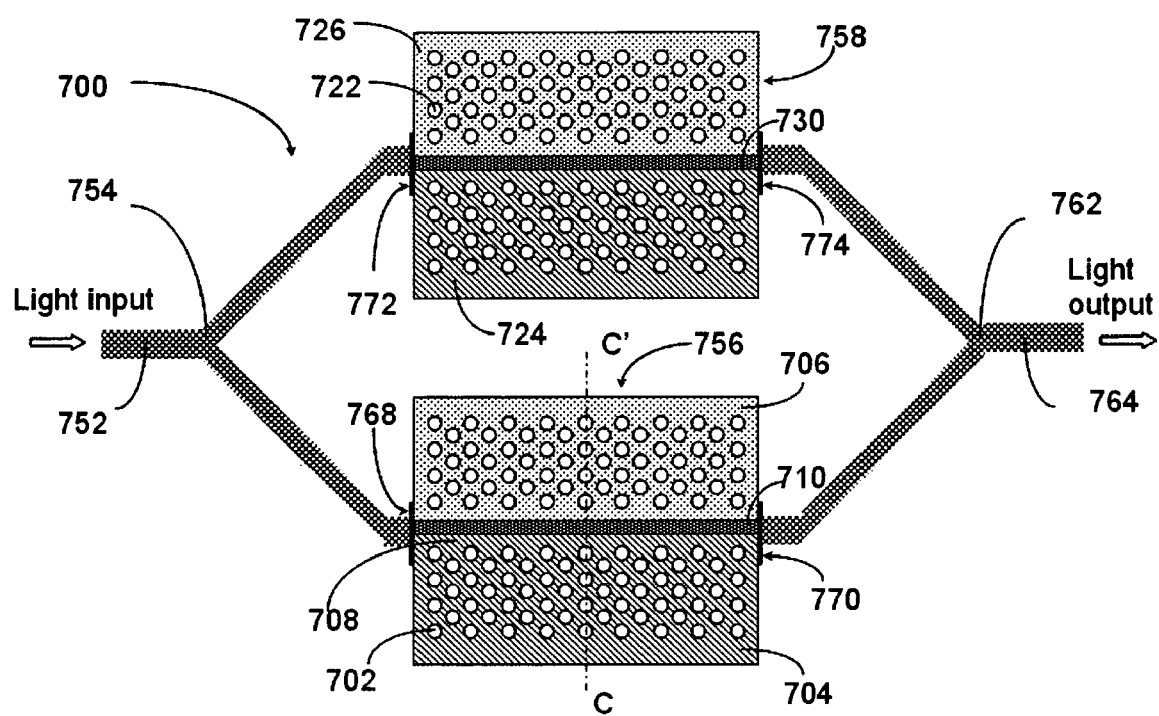
FIG. 7 is a top view of one embodiment of a photonic crystal waveguide modulator according to one embodiment of one aspect of the present invention.

FIG. 7 depicts one embodiment of an optical modulator 700 according to another aspect of the present invention. The modulator comprises an input waveguide 752, a waveguide splitter 754, first and second photonic crystal waveguides 756 and 758, a combiner 762, and an output waveguide 764. Four insulating spacers 768, 770, 772, and 774 are disposed at two ends of each of the first and second photonic crystal waveguides 756 and 758 in accordance with a feature of the present invention.

According to a preferred embodiment of the present invention, the waveguide splitter 754 and the waveguide combiner 762 are formed from a channel waveguide of conventional type although those skilled in the art will understand that other types of conventional waveguides or photonic crystal waveguides may be utilized to form the waveguide splitter and combiner as appropriate. The waveguide splitter 754 and beam combiner 762 may be formed from a variety of materials including, but not limited to, silicon, germanium, carbon, gallium nitride, gallium arsenide, gallium phosphide, indium nitride, indium phosphide, indium arsenide, aluminum arsenide, aluminium antimonide, zinc oxide, zinc sulfide, silicon oxide, silicon nitride, alloys thereof, metals, and organic polymer composites.

The insulating spacers 768 and 770 become necessary for an embodiment wherein one or more materials constituting the waveguide splitter 754 and the waveguide combiner 762 is substantially electrically conductive. The insulating spacer 768 interrupts an otherwise conductive path that may be formed from a corner (the lower-left one as depicted in FIG. 7) of the substantially electrically conductive region 706 to the end of a branch (the lower branch as depicted in FIG. 7) of the splitter 754 to a corner (the upper-left one as depicted in FIG. 7) of the substantially electrically conductive region 704. The electrically insulating spacer 768 may be formed from a variety of materials including, but not limited to, silicon oxide, silicon nitride, hafnium silicate, zirconium silicate, aluminum oxide, gadolinium oxide, ytterbium oxide, zirconium oxide, titanium oxide, tantalum oxide, niobium oxide, barium strontium titanate, silicon, alloys thereof, and organic polymers. In another embodiment wherein the waveguide splitter 754 and the waveguide combiner 762 are formed from insulating materials of relatively low dielectric strength, the spacer may be used to improve the dielectric breakdown threshold at the corners of the substantially electrically conductive regions 704 and 706. Thus, it assists in enhancing the reliability of the device 700.

According to the teachings of the present invention, a method of using the device 700 comprises applying an alternating voltage signal to at least one of the photonic crystal waveguides 756 and 758. Consider one embodiment of the method wherein an alternating voltage signal is applied to the photonic crystal waveguide 756 only. Now referring back to FIG. 6, the mode dispersion relation of the photonic crystal waveguide 756, wherein a voltage of V is applied, is given by curve 604; and the mode dispersion relation of the photonic crystal waveguide 758, wherein no voltage is applied, is given by curve 602. For a given frequency of light, it is known that the difference between the propagation constants $\beta_1$ for the waveguide 756 and the propagation constant $\beta_2$ for the waveguide 758 is inversely proportional to the group velocity $$\Delta\beta = \beta_1 - \beta_2 = b/v_g,$$

where b is a constant. For a small value of group velocity (e.g. one twentieth of the speed of light in vacuum), this results in a significantly large $\Delta\beta$, and therefore a significantly large phase difference, $$\Delta\phi = \Delta\beta \times L = b(L/v_g),$$

between the first signal and the second signal after they propagate through the waveguides 756 and 758, respectively. Here L is the length of the waveguides 756 and 758. The output signal from the output waveguide 764 depends on primarily on the value of $\Delta\phi$. If the group velocity $v_g$ is reduced by twenty times, then L can be reduced by twenty times while maintaining the same value of $\Delta\phi$. therefore substantially the same output signal. For the device 700 depicted in FIG. 7, dynamically changing the voltage applied across the two substantially electrically conductive regions 704 and 706 causes the phase difference, $\Delta\phi$, between the first and second signals to change dynamically, which results in a time-varying (or modulated) output signal exiting the output waveguide 764.

In one embodiment of the present invention, the entire structure depicted in FIG. 7 is formed on a silicon-on-insulator wafer, which has a silicon slab disposed on the top of a silicon oxide substrate. The input waveguide 752, the waveguide splitter 754, the waveguide combiner 762, and the output waveguide 764 may be formed in the silicon slab by the lithographic means widely used in integrated optics fabrication. The photonic crystal waveguides can be formed by patterning periodic arrays of apertures in proper regions of the slab in accordance with the present invention. In another embodiment of the present invention, the apertures may be filled with silicon oxide or silicon nitride for form the columnar members. The substantially electrically conductive regions 704 and 706 correspond to p-doped silicon and n-doped silicon regions, which can be formed through appropriate integrated optics fabrication processes. The insulating layer 710 may be formed through similar processes as the columnar members 702 and 722 that are made of silicon oxide or silicon nitride in some embodiments.

For one embodiment of the device 700 depicted in FIG. 7, a voltage of a few volts applied across the two substantially electrical conductive regions 704 and 706 causes the changes of electron and hole concentrations in the waveguide core 708 to be on the order of $3\times10^{17}$ $cm^{-3}$. This results in a change of the refractive index of silicon on the order of $10^{-3}$. In a conventional modulation, this value of $\Delta n$ would require a waveguide length L of a few millimeters to achieve a phase difference $\Delta\phi=\pi$, which is a typical requirement for the indication of substantial modulation effect. As mentioned above, the slow group velocity of light in photonic crystal waveguides 756 and 758 can be utilized to reduce the device interaction length by twenty times or more, which may reduce L to be less than 100 microns, or as short as 10 microns. The linear density of electrical current I/L required to produce certain values of carrier concentration changes remains substantially the same as in a device comprising conventional waveguides entirely. Therefore, the reduction of L generally leads to a reduction of the current I, and for a given voltage signal amplitude, a reduction of power consumption of the device 700.

In another embodiment of the method of using the device 700 in FIG. 7, an alternating voltage signal substantially inverse (i.e. 180° out of phase) to the alternating voltage signal applied to the waveguide 756 is applied to the photonic crystal waveguide 758. Other conditions unchanged, this "push-pull" configuration generally gives a larger value of $\Delta\phi$ than the configuration of applying voltage to waveguide 756 only. Furthermore, to produce the same value of $\Delta\Phi$ (and the same output signal) as in the configuration of applying voltage to waveguide 756 only, the push-pull configuration may require a lower voltage, and therefore a lower power consumption. The push-pull configuration may be used to advantage.

In another embodiment of the present invention, the photonic crystal waveguide 758 depicted in FIG. 7 may have a structure substantially different from that of the photonic crystal waveguide 756. The differences may include, but not limited to, the absence of the insulating layer 730, the absence of insulating spacers 772 and 774, a different value of the waveguide core width, a different waveguide length, different doping concentrations and profiles of the substantially electrically conductive regions 724 and 726, different values of the diameters of columnar members 722, and combinations thereof. In yet another embodiment of the present invention, the photonic crystal waveguide 758 may be replaced by a conventional waveguide.

Figure 8:
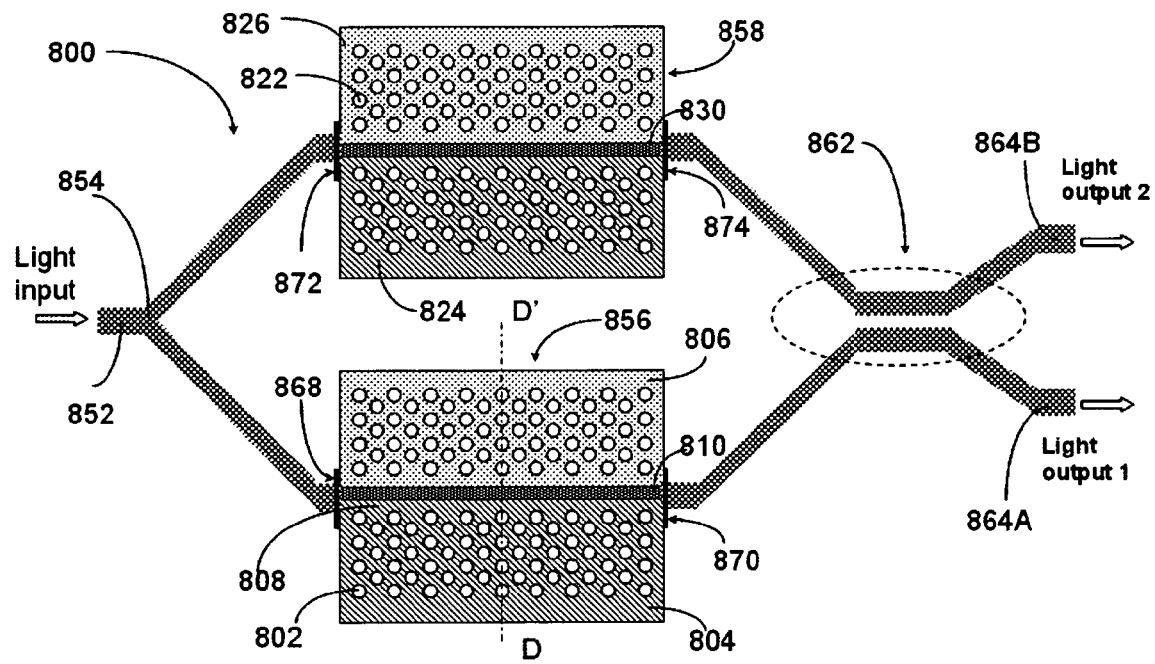
FIG. 8 is a top view of one embodiment of a photonic crystal waveguide switch according to one embodiment of another aspect of the present invention.

FIG. 8 depicts a preferred embodiment of an optical switch 800 according to one aspect of the present invention. The optical switch 800 comprises an input waveguide 852, a waveguide splitter 854, first and second photonic crystal waveguides 856 and 858, a directional coupler 862, and two output waveguides 864A and 864B. Four insulating spacers 868, 870, 872, and 874 are disposed at two ends of each of the first and second photonic crystal waveguides 856 and 858 in accordance with a feature of the present invention.

According to a preferred embodiment of the present invention, the waveguide splitter 854 and the directional coupler 862 are formed from a channel waveguide of conventional type although those skilled in the art will understand that other types of conventional waveguides or photonic crystal waveguides may be utilized to form the waveguide splitter 854 and directional coupler 862 as appropriate. The waveguide splitter 854 and directional coupler 862 may be formed from a variety of materials including, but not limited to, silicon, germanium, carbon, gallium nitride, gallium arsenide, gallium phosphide, indium nitride, indium phosphide, indium arsenide, aluminum arsenide, aluminium antimonide, zinc oxide, zinc sulfide, silicon oxide, silicon nitride, alloys thereof, metals, and organic polymer composites.

The insulating spacers 868 and 870 become necessary for an embodiment wherein one or more materials constituting the waveguide splitter 854 and the waveguide combiner 862 are substantially electrically conductive. The electrically insulating spacers 868 and 870 may be formed from a variety of materials including, but not limited to, silicon oxide, silicon nitride, hafnium silicate, zirconium silicate, aluminum oxide, gadolinium oxide, ytterbium oxide, zirconium oxide, titanium oxide, tantalum oxide, niobium oxide, barium strontium titanate, silicon, alloys thereof, and organic polymers. In another embodiment wherein the waveguide splitter 854 and the directional coupler 862 are formed from insulating materials of relatively low dielectric strength, the spacers 868 and 870 may be used to improve the dielectric breakdown threshold at the corners of the substantially electrically conductive regions 804 and 806. Thus, it assists in enhancing the reliability of the device 800.

The preceding discussions on the phase difference between the first and second optical signals after they propagate through the photonic crystal waveguides 756 and 758 in FIG. 7 remain valid for the first and second signals passing through the waveguides 856 and 858 illustrated in FIG. 8. The directional coupler 862 mixes the first and second signals exiting from waveguides 856 and 858 and to form two output signals. A first output signal exits the output waveguide 864A, and a second output signal exits the output waveguide 864B. These output signals vary with the phase difference, $\Delta\Phi$, between the first and second signals exiting waveguides 856 and 858. In one embodiment of the device depicted in FIG. 8, when $\Delta\phi$ equals a specific value $\Delta\phi_1$, the intensity of the first output signal is significantly larger than that of the second output signal; and when $\Delta\phi$ equals a specific value $\Delta\phi_2$, the intensity of the second output signal is significantly larger than that of the first output signal. By dynamically changing the value of $\Delta\phi$ between $\Delta\phi_1$ and $\Delta\phi_2$, the primary part of the signal is switched between the first output waveguide 864A and the second output waveguide 864B. Thus, the device 800 depicted in FIG. 8 serves as a 1×2 switch.

For one embodiment depicted in FIG. 8, the first and second photonic crystal waveguides 856 and 858 are identical. Therefore, a push-pull configuration can be utilized to further improve the device performance. In another embodiment of the present invention, the photonic crystal waveguide 858 depicted in FIG. 8 may have a structure substantially different from that of the photonic crystal waveguide 856. In yet another embodiment of the present invention, the photonic crystal waveguide 858 may be replaced by a conventional waveguide.

Figure 9:
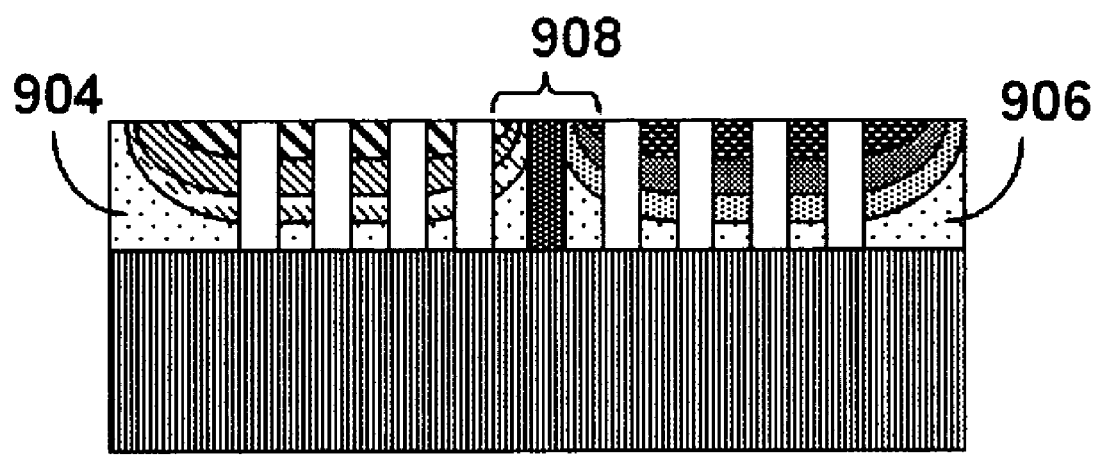
FIG. 9 is a cross-sectional view of one embodiment of a device shown in FIG. 7 or FIG. 8.
Figure 10:
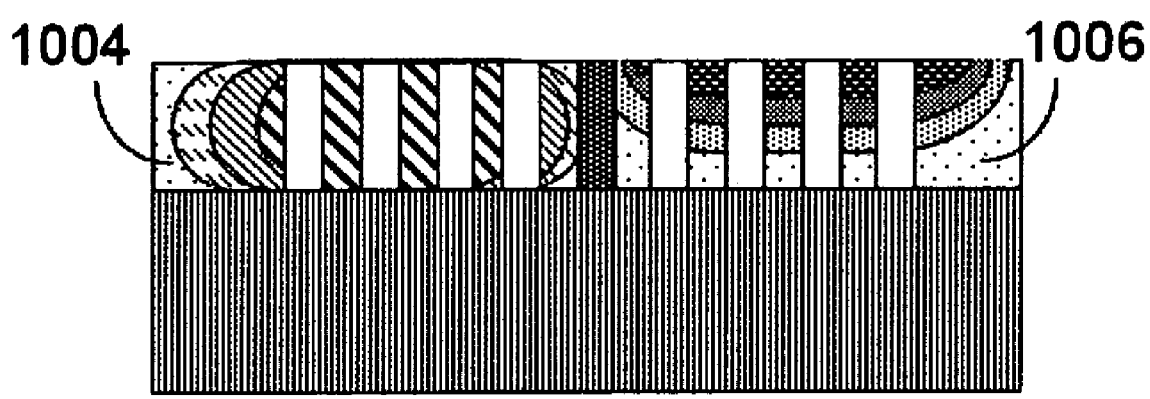
FIG. 10 is a cross-sectional view of another embodiment of a device shown in FIG. 7 or FIG. 8.
Figure 11:
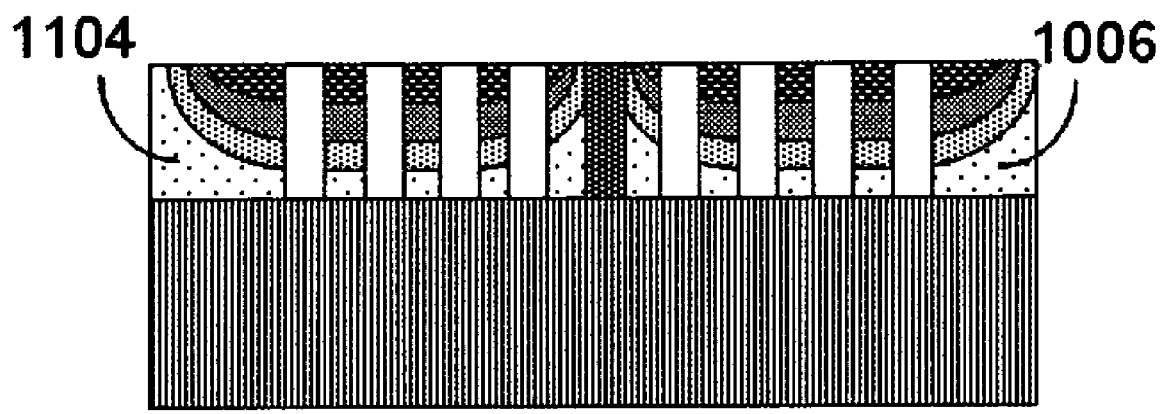
FIG. 11 is a cross-sectional view of a third embodiment of a device shown in FIG. 7 or FIG. 8.

Furthermore, several alternate embodiments of some features of the photonic crystal waveguide according to the present invention will be described in the following. These alternate embodiments of some features are applicable to any of the photonic crystal waveguide 100 depicted in FIG. 1, the photonic crystal waveguides 756 and 758 depicted in FIG. 7, the photonic crystal waveguides 856 and 858 depicted in FIG. 8, or other appropriate embodiments of the present invention. Now refer to the cross sectional views of photonic crystal waveguides depicted in FIGS. 9-11 according to these alternate embodiments of some features. These cross sectional views could be associated with any of the lines AA' in FIG. 1, CC' in FIG. 7, and DD' in FIG. 8. In one embodiment illustrated in FIG. 9, the dopant concentrations in the p-doped region 904 and n-doped region 906 are non-uniform. The highest dopant concentrations appear in certain areas at the top surface of each region. In one preferred embodiment of the present invention, the dopant concentrations in the waveguide core 908 depicted in FIG. 9 are on the order of $10^{17}$ $cm^{-3}$ or lower; whereas the peak dopant concentrations in certain areas at the top surface of the regions 904 and 906 and outside the core 908 can be $10^{19}$ $cm^{-3}$ or higher. In another embodiment illustrated in FIG. 10, the dopant concentrations in the p-doped region 1004 and n-doped region 1006 are non-uniform. The highest dopant concentration of the p-doped region 1004 appears amid the body of the region 1004, whereas the highest dopant concentration of the n-doped region 1006 appears on the top surface of the region 1006. In yet another embodiment illustrated in FIG. 11, both the region 1104 and region 1106 are n-doped with non-uniform dopant concentrations. As illustrated in FIGS. 9-11, the doping concentration may have a gradient both vertically and horizontally.

The advantage of non-uniform doping as illustrated in FIG. 9 is that the doping concentration in the core can controlled to a low level such that the optical loss of the waveguide is sufficiently low. This is because the optical loss is primarily determined by the light absorption by the materials disposed in the waveguide core 908 where light field is the strongest. In addition, the high doping concentrations in a substantial volume of regions 904 and 906 help reduce the electrical resistance of the device and therefore enhance the modulation or switching speed of the device. These advantages are applicable to the structures illustrated in FIGS. 10 and 11 as well.

Figure 12:
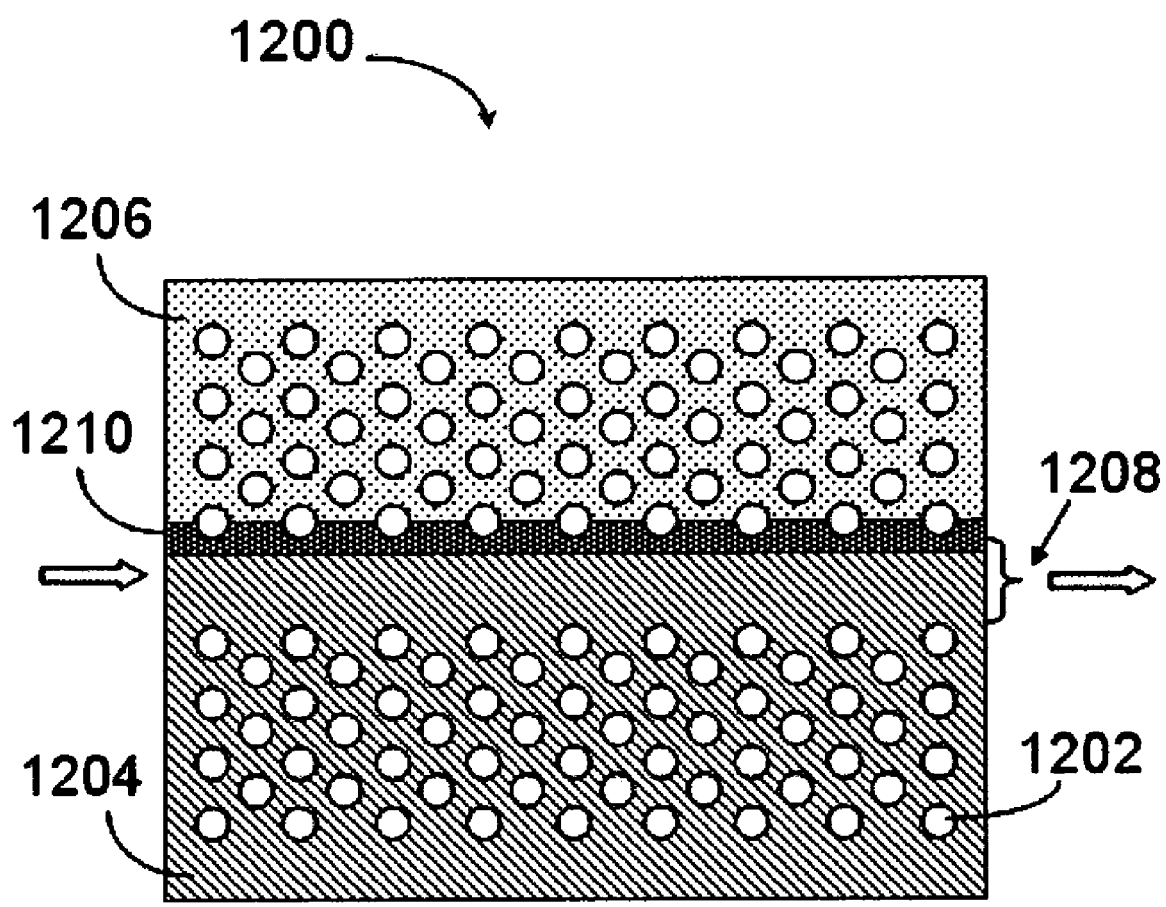
FIG. 12 is a top view of an alternate embodiment of a device shown in FIG. 1.

FIG. 12 depicts a top view of another embodiment of a photonic crystal waveguide 1200 according to one aspect of the present invention. The primary feature of this embodiment in contrast to the embodiment depicted in FIG. 1 is that the insulating layer is positioned partially outside the waveguide core 1208. In yet another embodiment, the insulating layer may be positioned inside the waveguide core but off the center axis of the waveguide core. In a preferred embodiment, the insulating layer 108 has a rectangular shape when being viewed from the top as illustrated in FIG. 1. In alternate embodiments, the insulating layer may have an irregular shape when being viewed from the top, an exemplary embodiment being depicted in FIG. 12. Whether inside or proximate to the core, the insulating layer should generally be aligned in parallel with the waveguide core.

Figure 13:
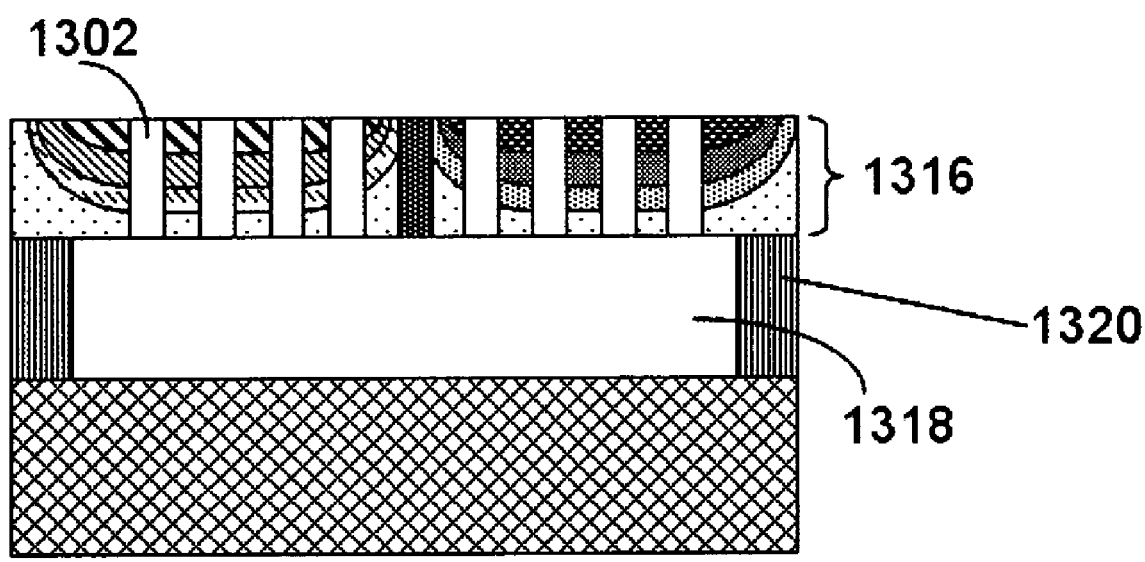
FIG. 13 is a cross-sectional view of one embodiment of a substrate and a superstrate for a device shown in FIGS. 1, 7, and 8 in accordance with one aspect of the present invention.
Figure 14:
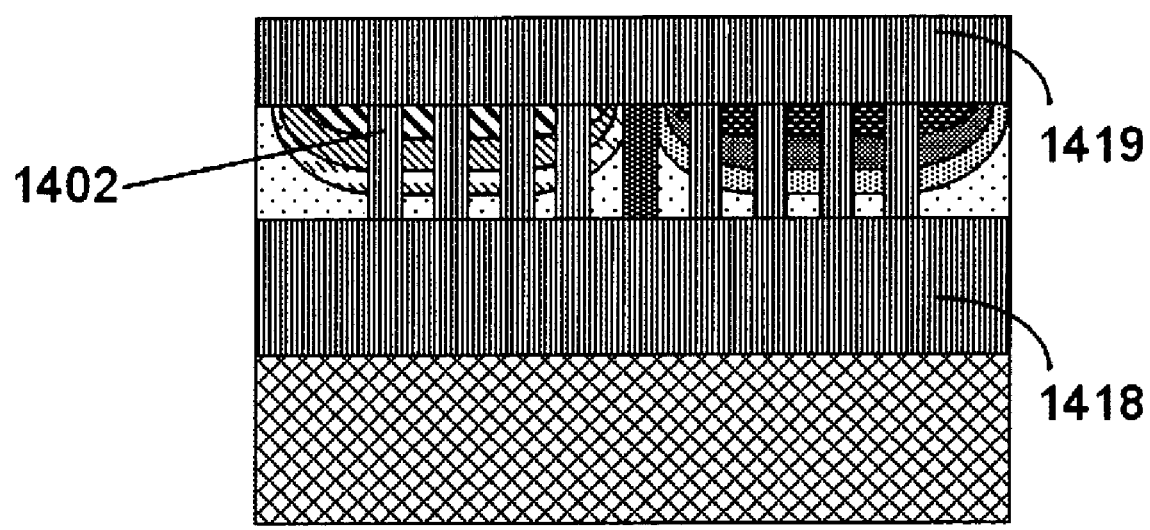
FIG. 14 is a cross-sectional view of another embodiment of a substrate and a superstrate for a device shown in FIGS. 1, 7, and 8 in accordance with one aspect of the present invention.

FIGS. 13 and 14 depict the cross sectional views of two alternate embodiments of the substrate and superstrate. These cross sectional views could be associated with any of the lines AA' in FIG. 1, CC' in FIG. 7, and DD' in FIG. 8. In one embodiment depicted in FIG. 13, both the substrate 1318 and the superstrate are air. Additional materials 1320 may be disposed in the region beneath the slab and outside the photonic crystal waveguide (i.e. where the columnar members are absent) to provide mechanical support as appropriate. In one preferred embodiment, the columnar members 1302 depicted in FIG. 13 may be formed from air. In another embodiment depicted in FIG. 14, both the substrate 1418, the superstrate 1419, and the columnar members 1402 are formed from one dielectric material, which could be either silicon oxide or silicon nitride in a preferred embodiment of this aspect of the present invention. FIG. 4 indicates that generally light is guided or confined in the slab by appropriate choices of the substrate and superstrate.

Although the word of "light" is used to denote the signals in the preceding discussions, one skilled in the art will understand that it refers to a general form of electromagnetic radiation that includes, but not limited to, visible light, infrared light, ultra-violet light, radio waves, and microwaves.

In summary, the present invention provides device architectures for switching, modulation, and dynamical control of light transmission with reduced power consumption and high speed. Owing to the small dimensions of the devices presented herein, one can potentially integrate a large array of such devices on a single semiconductor chip. Such device integration significantly reduces the volume, weight, and cost of the devices, and is highly desirable in a wide range of applications. The device structures are easy to fabricate using the fabrication techniques for integrated optical devices because they have two-dimensional planarized forms.

While the invention has been described in connection with a number of preferred embodiments, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An apparatus for dynamic control of light transmission comprising:
   a photonic crystal waveguide comprising a waveguide core capable of transmitting light therethrough;
   an electrically insulating layer formed within or near said waveguide core;
   a first substantially electrically conductive region formed on one lateral side of said electrically insulating layer; and
   a second substantially electrically conductive region formed on another lateral side of said electrically insulating layer and electrically coupled to said first substantially electrically conductive region across said electrically insulating layer;
   wherein each of said first and second substantially electrically conductive regions comprises doped semiconductors, wherein the spatial distributions of the dopants are not uniform.

2. The apparatus of claim 1, wherein said photonic crystal waveguide further comprises: a slab of a first material, a plurality of substantially identical members formed from a second material and positioned within or proximate to said slab, wherein said waveguide core is proximate to said plurality of substantially identical members.

3. The apparatus of claim 2, wherein said electrically insulating layer is substantially parallel to said waveguide core.

4. The apparatus of claim 2, wherein at least one of said substantially electrically conductive region overlaps with said waveguide core.

5. The apparatus of claim 2, wherein said photonic crystal waveguide has a single guided-mode.

6. The apparatus of claim 1, wherein the material of said electrically insulating layer comprises at least one of silicon oxide, silicon nitride, hafnium silicate, zirconium silicate, aluminum oxide, gadolinium oxide, ytterbium oxide, zirconium oxide, titanium oxide, tantalum oxide, niobium oxide, barium strontium titanate, intrinsic silicon, alloys thereof, and organic polymers.

7. The apparatus of claim 2, wherein the slab material comprises at least one of silicon, germanium, carbon, gallium nitride, gallium arsenide, gallium phosphide, indium nitride, indium phosphide, indium arsenide, aluminum arsenide, aluminium antimonide, zinc oxide, zinc sulfide, silicon oxide, silicon nitride, alloys thereof, and organic polymers.

8. The apparatus of claim 2, wherein said plurality of substantially identical members comprise at least one substantially periodic array of substantially columnar members formed from at least one of air, silicon oxide, silicon nitride, alumina, zinc oxide, alloys thereof, and organic polymers.

9. The apparatus of claim 1, wherein said first and second substantially electrically conductive regions comprise oppositely doped semiconductors.

10. The apparatus of claim 1, wherein said first and second substantially electrically conductive regions comprise substantially identically doped semiconductors.

11. The apparatus of claim 1, wherein said apparatus is a tunable optical delay line.

12. The apparatus of claim 1, wherein said apparatus is a tunable optical filter.

13. An apparatus comprising:
   an input waveguide adapted to receive a signal;
   an optical splitter adapted to split said signal into a first and a second signal;
   a first waveguide adapted to receive and transmit said first signal;
   a second waveguide adapted to receive and transmit said second signal; and
   a coupling member adapted to receive said first and second signals from said first and second waveguides and mix said first and second signals to form at least one output signal;
   wherein at least one of said first and second waveguides comprises a photonic crystal waveguide comprising: a waveguide core adapted to receive and transmit said first or second signal; an electrically insulating layer formed within or near said waveguide core; and two substantially electrically conductive regions, each being formed on one side of said electrically insulating layer and electrically coupled to the other substantially electrically conductive region across said insulating layer.

14. The apparatus of claim 13, wherein each of said first and second waveguides comprises: a slab of a first material; and a plurality of substantially identical members formed from a second material and positioned within or proximate to said slab, wherein said waveguide core is proximate to said plurality of substantially identical members.

15. The apparatus of claim 14, further comprising an electrically insulating spacer disposed at each end of each said photonic crystal waveguide and adapted to prevent charges from travelling therethrough.

16. The apparatus of claim 13, wherein said coupling member is a combiner further comprising one output port adapted to transmit a single output signal formed from a combination of said first and second signals.

17. The apparatus of claim 13, wherein said coupling member is a directional coupler further comprising two output ports adapted to transmit two output signals, each being a part of a mixture of said first and second signals.

18. The apparatus of claim 14, wherein said plurality of substantially identical members comprise at least one substantially periodic array of substantially columnar members formed from at least one of air, silicon oxide, silicon nitride, alumina, zinc oxide, alloys thereof, and organic polymers.

19. The apparatus of claim 16, wherein the apparatus is a modulator.

20. The apparatus of claim 17, wherein the apparatus is a switch.

21. The apparatus of claim 14, further comprising: a substrate comprising a material having a refractive index lower than the refractive index of said slab; and a superstrate comprising a material having a refractive index lower than the refractive index of said slab.

22. The apparatus of claim 21, wherein the materials of said substrate and superstrate comprise at least one of silicon oxide, silicon nitride, air, gallium nitride, gallium arsenide, gallium phosphide, indium nitride, indium phosphide, indium arsenide, aluminum arsenide, aluminium antimonide, zinc oxide, zinc sulfide, alloys thereof, and organic polymers.

23. A method for applying dynamic control to an input signal comprising:
   dividing an input optical signal into a first signal and a second signal;
   transmitting said first signal through a first waveguide;
   transmitting said second signal through a second waveguide;
   dynamically changing the phase or amplitude of at least one of said first and second signals by applying an alternating voltage signal to at least one of said waveguides;
   and mixing said first and second signals to form one or two output signals;
   wherein at least one of said waveguides comprises a photonic crystal waveguide comprising: a waveguide core adapted to transmit said first or second signal; a plurality of substantially identical members positioned within or proximate to a slab, wherein said waveguide core is positioned in said slab and is proximate to said plurality of substantially identical members; an electrically insulating layer formed within or proximate to said waveguide core; and two substantially electrically conductive regions, which are laterally separated by said electrically insulating layer and to which said alternating voltage signal is applied.

* * * * *